United States Patent [19]
Zettl et al.

[11] 3,743,917
[45] July 3, 1973

[54] ARRANGEMENT FOR MAINTAINING A CONSTANT DIRECT CURRENT VOLTAGE

[75] Inventors: Herbert Zettl, Erfelden; Emil Siegel, Darmstadt-Arheilgen, both of Germany

[73] Assignee: Fernseh GmbH, Darmstadt, Germany

[22] Filed: Nov. 1, 1971

[21] Appl. No.: 194,739

[30] Foreign Application Priority Data
Oct. 31, 1970 Germany............. P 20 53 512.0

[52] U.S. Cl........... 321/18, 178/DIG. 11, 179/16 F, 323/24, 323/40
[51] Int. Cl........................... G05f 1/64, G05f 1/56
[58] Field of Search................. 179/16 F; 178/DIG. 11, 7.2; 323/4, 22 SC, 24, 40; 321/18

[56] References Cited
UNITED STATES PATENTS

| | | | |
|---|---|---|---|
| 3,388,317 | 6/1968 | Birman | 323/40 |
| 3,423,689 | 1/1969 | Miller et al. | 323/40 |
| 3,597,675 | 8/1971 | Peek et al. | 323/22 SC |
| 3,374,420 | 3/1968 | Weber, Jr. | 323/22 SC |
| 3,564,388 | 2/1971 | Nolf | 323/22 SC |

OTHER PUBLICATIONS
DC Power Supply Handbook by Hewlett Packard; 2nd Printing, 1970; pg. 74–82, Relied upon.

*Primary Examiner*—Gerald Goldberg
*Attorney*—Michael S. Striker

[57] ABSTRACT

An arrangement for maintaining a constant voltage at a variable load includes an adjustable direct current voltage source having a positive and a negative pole. A voltage regulator is provided which has comparator inputs and a triac which is connected to the voltage source for adjusting the voltage source in response to changing values of voltages applied to the comparator inputs. Four similar conductors are provided which are equal and adjustable in length and which together form a bridge circuit for maintaining the load voltage constant independently of the conductor lengths. To accomplish this, the first conductor is connected between the positive pole of the voltage source to one terminal of the load, the second conductor is connected between the negative pole of the voltage source and to other terminal of the load, the third conductor is connected between the one terminal of the load and the one comparator input of the voltage regulator, and the fourth conductor is connected between the other terminal of the load and the other comparator input of the voltage regulator. A voltage equalizer is interposed between the third conductor and the one comparator input to equalize the voltages applied to the differential inputs of an operational amplifier whose output controls the triac. A full wave rectified voltage derived from the main alternating current power source is supplied to one of the differential inputs of the operational amplifier and a sawtoothed reference voltage is applied to the other differential input, these two fluctuating voltages being superimposed on the direct current voltages supplied by the third and fourth conductors.

4 Claims, 2 Drawing Figures

Patented July 3, 1973
3,743,917
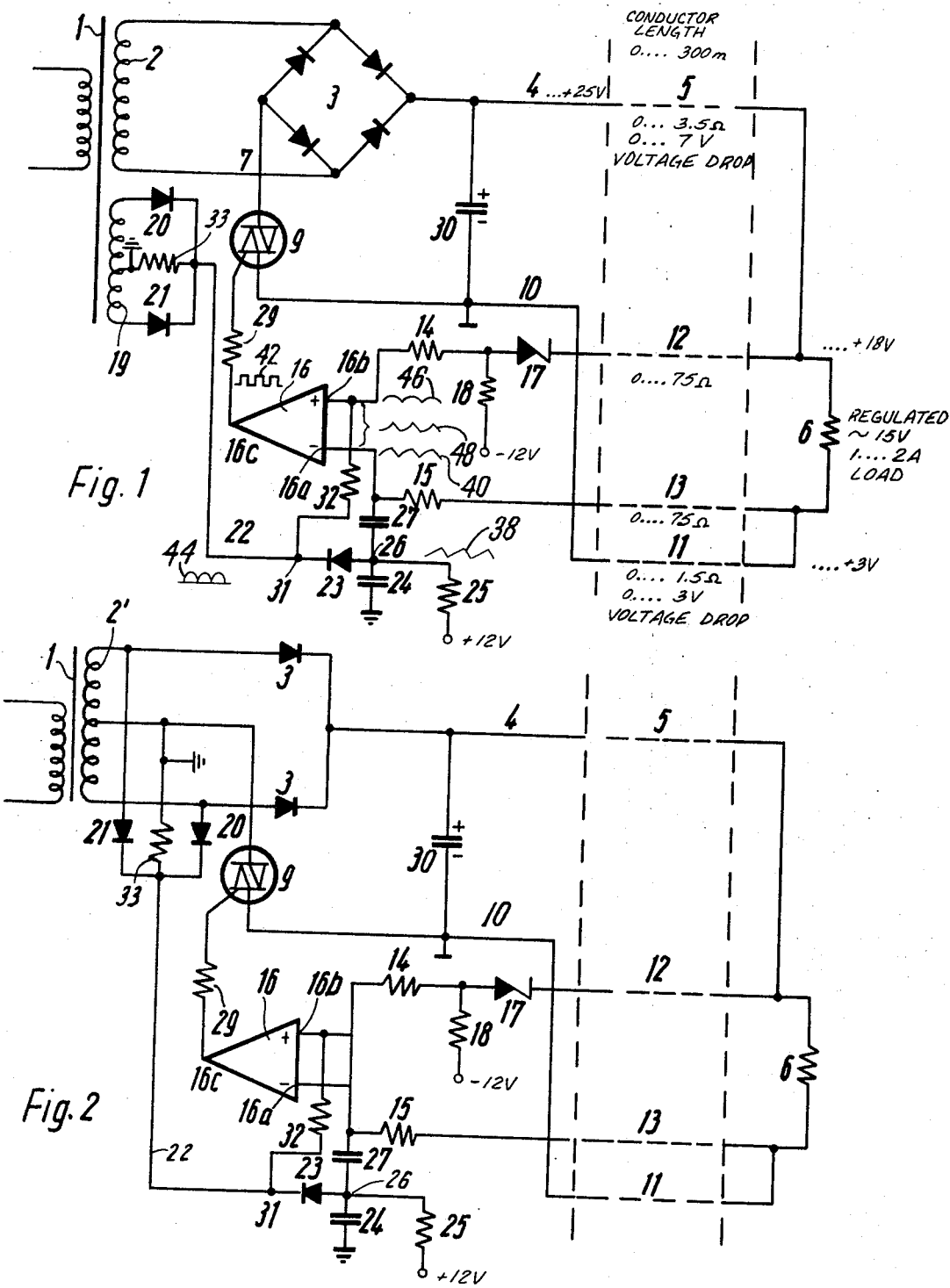

ARRANGEMENT FOR MAINTAINING A CONSTANT DIRECT CURRENT VOLTAGE

BACKGROUND OF THE INVENTION

The present invention involves an arrangement for maintaining a constant voltage at a variable load, and in particular at a camera using variable currents.

It often occurs that an electrical apparatus must be supplied a constant direct current voltage, said electrical apparatus often being removed from the voltage source by substantial distances. In such cases the electrical apparatus is connected by conductors to the voltage source. When the length of the connecting electrical conductors is constant, the voltage source, which is usually regulated, can be adjusted to compensate for the resistive properties of the conductors with the resultant voltage drops. When, however, the distance between the load and the power supplies varies, this requiring different conductor lengths for interconnecting the power supply and load, the total resistance between the voltage source and the load changes and consequently the voltage at the load likewise changes. For example, in the television art, there often arises the problem of supplying a television camera with a constant direct voltage, and it is necessary that the voltage level should in fact remain constant even though the load to the television camera changes or when the length of the camera cable is increased or reduced or when the level of the alternating current voltage providing the direct current voltage supply fluctuates.

Various circuit arrangements are known or have been proposed for solving this problem. The prior art arrangements have generally been complicated and costly to implement.

SUMMARY OF THE INVENTION

It is an object of the present invention to provide an arrangement for maintaining a constant voltage at a variable load which does not have the disadvantage found in the prior art.

It is another object of the present invention to provide an arrangement for maintaining a constant voltage at a variable load which is simple in construction and inexpensive to manufacture and which maintains the voltage at a constant value independently of the length of the conductors connecting the load and a voltage source.

A further object of the present invention is to provide an arrangement for maintaining a constant voltage at a variable load independently of the length of the cables connecting the load and the direct current voltage source, and adjusting the direct current voltage of the load to compensate for changes in the level of the alternating current voltage which energizes the direct current voltage supply.

It is a still further object of the present invention to provide an arrangement for maintaining a constant voltage at a variable load which avoids transmission to the load of interference impulses which may be produced by the regulating circuit.

In accordance with the present invention, an arrangement is provided for maintaining a constant voltage at a variable load having two terminals, particularly a camera using variable currents. The arrangement comprises in combination an adjustable direct current voltage source having a positive and a negative pole. A voltage regulating means having two comparator inputs and adjusting means is connected to the voltage source for adjusting said voltage source in response to changing values of voltages applied to said comparator inputs. Four similar conductors of equal length are provided, the first conductor being connected to the positive pole of the voltage source and to one terminal of the load, the second conductor being connected to the negative pole of the voltage source and to the other terminal of the load, the third conductor being connected to one terminal of the load and to one comparator input of the voltage regulating means, and the fourth conductor being connected to the other terminal of the load and to the other comparator input of the voltage regulating means. In this manner, the conductors form a bridge circuit for maintaining the load voltage constant independently of the conductor length. According to a presently preferred embodiment, a full wave rectified signal and a sawtooth reference voltage, both derived from the alternating current power source which energizes the direct current voltage source, are respectively fed to one and another of differential inputs of an operational amplifier which forms part of the voltage regulating means. The fluctuating voltages are superimposed on the voltages supplied by the third and fourth conductors. A triac, connected between a full wave rectifying bridge which forms part of the adjustable direct current voltage source and the output of the operational amplifier regulates the output voltage of the adjustable direct current voltage source.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a schematic of an arrangement for maintaining a constant voltage at a variable load in accordance with the present invention; and FIG. 2 is a schematic of a modified arrangement of the schematic shown in FIG. 1.

DESCRIPTION OF THE PREFERRED EMBODIMENTS

Referring to the drawings, in which like reference numerals are used to designate like parts throughout, and looking first to FIG. 1, an arrangement for maintaining a constant voltage at a variable load is shown in schematic. Although not limited thereto, the present invention will be described in connection with maintaining a constant voltage for a television camera.

Transformer 1 has a secondary winding 2 and is connectable to an alternating current power source which energizes the entire circuit. The secondary winding 2 is connected to a diode bridge 3, the diode bridge comprising four diodes in a full wave rectification arrangement in a commonly known manner. The diode bridge 3 is connected to the secondary 2 at two diagonally opposite points. The two other diagonally opposite points of the diode bridge 3 provide the path for the direct current which passes through the load 6. Thus, the diode bridge is connected to a conductor 4 which carries the output voltage of the adjustable direct current voltage source. The conductor 4 is connected to a conductor 5 which represents a television cable which carries the D.C. voltage to the television camera. The conductor 5 is connected to the load 6 at one of its terminals. The conductor 5 is shown in dashed lines to indicate that the length of the conductor 5 is variable and may also have substantial length. Accordingly, it will be understood that the resistance of the conductor 5 is appreciable in comparison with the negligible resistance of the conductor 4. Similarly, the terminals of the load 6 do not necessarily mean the conventional or physical terminals of the load but this refers to connections made to the load in the region of the load whereby the resistance contribution between the load and the conductor 5 is negligible in comparison with the resistance of the latter.

The other diagonal point opposite the point connecting with the conductor 4 is connected to the conductor 7 which is in turn connected to the triac 9. The triac 9 is connected through conductor 10 to the conductor 11. The conductor 11 is connected to the other terminal of the load 6. Again, it is pointed out that the resistance of the conductor 10 is negligible in comparison with the resistance of the conductor 11, in most instances.

Conductor 12, like conductors 5 and 11, is of variable length and may represent a substantial resistance. Conductor 12 is connected between the one terminal of the load 6 and a resistor 14. In a similar manner, the conductor 13 is connected between the other load terminal and a resistor 15. Resistors 14 and 15, which a current limiting resistors, are connected to an operational amplifier 16 which has differential inputs 16a and 16b and output 16c. Thus, the limiting resistors 14 and 15 protect the operational amplifier 16 from being damaged by too large currents which may flow into the inputs 16a and 16b. The points connecting the conductors 12 and 13 with the regulating circuit are designated as comparator inputs.

The conductor 5 carries the high positive voltage from the adjustable direct current voltage source to the load 6. The circuit has a reference potential point which is defined by the junction point of conductor 10 and the triac 9. Because conductors 10 and 11 are connected to the other terminal of the load 6, that terminal is near the reference or ground potential for the circuit. In order to equalize the voltages at the differential inputs 16a and 16b, an equalizing circuit is provided between the resistor 14 and the conductor 12. The equalizing circuit comprises a zener diode 17 and a shunt resistor 18, which resistor is connected either to the ground potential or to a suitable reference voltage. A voltage of −12 volts is used in the arrangement of FIG. 1. In this manner, the higher voltage which is supplied by the conductor 12 is substantially dropped across the zener diode 17, this leaving a smaller voltage to be applied at the differential input 16b.

In effect, the triac 9 controls the amount of direct current which can flow through the diode bridge 3 and the load 6. The output 16c of the operational amplifier 16 is connected to the gate of the triac 9 by means of a limiting resistor 29. By varying the voltage of the output 16c, the switching time of the triac 9 or the angle of the conduction period is controlled to thereby control the average D.C. current which is available at the load 6.

The transformer 1 has a secondary winding 19 which has induced in it an alternating current voltage from the main current power source which drives the circuit. Rectifying diodes 20 and 21 are connected to the secondary winding 19 in a commonly known manner. The diodes 20 and 21 are connected to each other and a resistor 33 is connected between the connecting point of the diodes and a center tap of the secondary or auxiliary winding 19. The output of the rectifying arrangement, comprising diodes 20 and 21, is supplied via conductor 22 to a sawtooth reference generating means which comprises diode 23, capacitor 24, resistor 25 and a reference voltage. This reference voltage is +12 volts in the arrangement of FIG. 1. These latter components comprise an integrating circuit which produces sawtooth reference voltage signals 38 at the reference point 26. These sawtooth reference signals 38 are capacitively supplied via capacitor 27 to the differential input 16a. Connected to the connector 22 is a resistor 32 which is connected between the reference point 31 and the differential input 16b. Resistor 32 linearizes the control operation in the manner to be described.

A polarized capacitor 30 is connected between the conductor 4 and the circuit reference ground potential and is utilized to filter the output of the diode bridge 3 to thereby produce a low ripple D.C. voltage.

During operation, the voltage at differential input 16a consists of a D.C. voltage which is superimposed a sawtooth reference voltage 40 as shown in FIG. 1. At the differential input 16b, first neglecting the effect of the resistor 32, is found a D.C. voltage whose level is approximately equal to the D.C. level found at the differential input 16a. However, because of the sawtooth voltage at the differential input 16a, the total voltage at the terminal 16a is such that it varies between levels which extend below and above the levels found at the differential input 16b. The arrangement is adjusted so that whenever the fluctuating voltage at the differential input 16a reaches the voltage present at the differential input 16b, the output of the operational amplifier 16c rises to provide an impulse 42 as shown in FIG. 1 to the triac 9 which is connected through the resistor 29. During the period or angle that the triac is conducting, the capacitor 30 charges up to maintain the D.C. voltage level. By shifting the levels of the voltages at the differential inputs 16a and 16b, the angle of conduction is accordingly changed to charge the capacitor 30 more or less as required.

As illustrated in FIG. 1, conductors 5, 12, 13 and 11 are all of variable lengths and are all equal in any particular arrangement. Preferably, all of these latter conductors have the same resistance per unit length so that they each represent equal resistances for equal lengths. In the arrangement shown in FIG. 1, the conductors can change in length from 0 to 300 meters. Corresponding to these variations in length, conductor 5 changes in resistance from 0 to 3.5 ohms, conductor 11 from 0 to 1.5 ohms, and conductors 12 and 13 each vary between 0 and 75 ohms. The voltage drops across conductors 5 and 11, varies between 0 and 7 volts and 0 and 3 volts respectively over these conductor length limits. For a nominal voltage of +25 volts at the output of capacitor 30, the regulated voltage maintained across the load 6 is approximately 15 volts for load currents of between 1 and 2A. It will be appreciated, that with the circuit as above described, not only will the load voltage be maintained constant with changes in the input alternating current power source or changes in load 6, but the voltage across the load 6 will automatically be maintained at a constant value irrespective of the lengths of the conductors 5, 12, 13 and 11. These latter conductors form an effective bridge circuit which has the effect of adjusting the load voltage in the proper direction as the conductor lengths change without the requirement that the load voltage change. Thus, when the voltage across the load 6 is constant and the D.C. current conductors 5 and 11 are changed in length, the conductors 12 and 13 are correspondingly changed in length and these two latter conductors immediately modify the voltages present at the differential inputs 16a and 16b which causes the adjustable direct current voltage source to modify the voltage to compensate for the changes in the conductor lengths. In effect, the voltage regulation as a function of conductor length is not purely a output voltage feedback circuit.

Because the control characteristic of the circuit arrangement described is non-linear, however, when the angle of flow of the current is large, a given change in the switch-on time results in a relatively smaller change in voltage in comparison with the same change in the switch-on time when the angle of the current-flow is smaller. In order to linearize this control characteristic, the full-wave rectified pulsating D.C. voltage 44 shown in FIG. 1 available on the line 22 and supplied by the full-wave rectifier diodes 20 and 21 is applied from the connection point 31 to the input 16b of the operational amplifier 16 (voltage 46 in FIG. 1) through the resistor 32. The resultant fluctuating voltage 48 applied between differential inputs 16a and 16b is shown in FIG. 1. An adjustment of the resistor 32 makes it possible to obtain the required linearity of the control characteristic.

FIG. 2 shows a variant of the circuit arrangement illustrated in FIG. 1. In this embodiment, the transformer 1 requires only one secondary winding 2' which, however, must now be tapped off at the center. Thus, the same secondary winding 2' is used for producing the direct current by means of the diodes 3, as well as supplying the diodes 20 and 21 which produce the signals necessary for operating the operational amplifier 16.

It will be understood that each of the elements described above, or two or more together, may also find a useful application in other types of voltage regulating circuits differing from the types described above.

While the invention has been illustrated and described as embodied in an arrangement for maintaining a constant voltage at a variable load, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. Arrangement for maintaining a constant voltage at a variable remote load having a first and second load terminal, comprising, in combination, transformer means furnishing an AC voltage; rectifier means connected to said transformer means for furnishing a DC voltage at a first and second rectifier output terminal; triac means having a first main terminal connected to said first rectifier output terminal, a second main terminal and a gate; means connecting at least one of said main terminals to ground potential; capacitor means connected from said second main terminal to said second bridge output terminal; first conductor means for connecting said second main terminal of said triac means to said first load terminal and for connecting said second bridge output terminal to said second load terminal; comparator means having a first and second comparator input and a comparator output connected to said gate of said triac means; first comparator input circuit means connected to said first comparator input, said first comparator input circuit means comprising Zener diode means and first resistance means connected between said Zener diode means and said first comparator input; second comparator input circuit means connected to said second comparator input, said second comparator input circuit means comprising second resistance means having a first terminal connected to said second comparator input and a second terminal; sawtooth voltage generator means interconnected between said transformer means and said second comparator input for furnishing a sawtooth voltage to said second comparator input; second conductor means for connecting said second load terminal to said Zener diode means and said first load terminal to said second terminal of said second resistance means; and linearizing means for furnishing a predetermined portion of said DC voltage to said first comparator input, said linearizing means comprising additional rectifier means connected to said transformer means and third resistance means connected between the output of said additional rectifier means and said first comparator input.

2. An arrangement as set forth in claim 1, wherein said comparator means comprise differential amplifier means having a direct input constituting said first comparator input and an inverting input constituting said second comparator input.

3. An arrangement as set forth in claim 1, wherein said transformer means have a first and second secondary winding; wherein said rectifier means comprise bridge circuit means connected to the output of said first secondary winding; and wherein said additional rectifier means of said linearizing means are connected to the output of said second secondary winding.

4. An arrangement as set forth in claim 1, wherein said transformer means has a single secondary winding having a first and second end terminal and a centered tap; wherein said rectifier means comprise a first and second rectifier element having input terminals respectively connected to said first and second end terminal, and output terminals connected in common to constitute said second bridge output terminal; wherein said first bridge output terminal is said centered tap; and wherein said additional rectifier means comprise a third and fourth rectifier element having respective input terminals connected to said first and second end terminal and output terminals connected in common to said third resistance means.

* * * * *

UNITED STATES PATENT OFFICE
CERTIFICATE OF CORRECTION

Patent No. 3,743,917           Dated July 3, 1973

Inventor(s) Herbert Zettl et al.

It is certified that error appears in the above-identified patent and that said Letters Patent are hereby corrected as shown below:

On the cover sheet item 73 should read as follows:

-- Assignee: Robert Bosch Fernsehanlagen GmbH. --

Signed and sealed this 30th day of April 1974.

(SEAL)
Attest:

EDWARD M. FLETCHER, JR.
Attesting Officer

C. MARSHALL DANN
Commissioner of Patents